US008827278B2

(12) United States Patent
Chen et al.

(10) Patent No.: US 8,827,278 B2
(45) Date of Patent: Sep. 9, 2014

(54) ADAPTOR FOR ADAPTING A WORKING ELEMENT TO AN END OF A POWER TOOL SHAFT

(75) Inventors: Zhiguo Chen, Nanjing (CN); Xiaofeng Zhang, Nanjing (CN); Baijun Zhang, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 911 days.

(21) Appl. No.: 13/005,065

(22) Filed: Jan. 12, 2011

(65) Prior Publication Data

US 2011/0291368 A1 Dec. 1, 2011

(30) Foreign Application Priority Data

May 28, 2010 (CN) .......................... 2010 1 0192679

(51) Int. Cl.

*B23B 31/02* (2006.01)
*B25F 3/00* (2006.01)
*B24B 27/08* (2006.01)
*B24B 23/04* (2006.01)
*B24B 45/00* (2006.01)

(52) U.S. Cl.

CPC . *B25F 3/00* (2013.01); *B24B 27/08* (2013.01); *B24B 23/04* (2013.01); *B24B 45/00* (2013.01)
USPC .......... 279/141; 379/143; 30/339; 83/698.11; 83/782; 451/356

(58) Field of Classification Search

USPC ............ 279/141, 143, 144, 145; 30/329, 333, 30/337–339, 331; 83/698.11, 697, 782; 451/356, 357, 359
See application file for complete search history.

(56) References Cited

U.S. PATENT DOCUMENTS 4,015,371 A * 4/1977 Grayston ...................... 451/342
4,657,428 A 4/1987 Wiley
D360,946 S 8/1995 Goris
5,554,165 A 9/1996 Raitt et al.
5,676,680 A * 10/1997 Lim ............................. 606/176
5,702,415 A 12/1997 Matthai et al.
6,499,381 B2 * 12/2002 Ladish et al. .................. 81/429
6,705,807 B1 * 3/2004 Rudolph et al. .............. 408/1 R
6,780,093 B2 * 8/2004 Krondorfer et al. .......... 451/344
6,796,888 B2 * 9/2004 Jasch ........................... 451/342
7,189,239 B2 * 3/2007 Fisher et al. .................... 606/82
7,207,873 B2 * 4/2007 Hesse et al. .................. 451/359

(Continued)

FOREIGN PATENT DOCUMENTS

DE 20122817 U1 2/2008
DE 202010013008 U1 2/2011

*Primary Examiner* — Eric A Gates
(74) *Attorney, Agent, or Firm* — Greenberg Traurig, LLP

(57) ABSTRACT

An adaptor for adapting a working element to an end of a power tool shaft. The adaptor includes a central hole passing through the adaptor and has a longitudinal axis, a driving end facing the end of the shaft, and a tool end facing the working element and having a protruding portion, wherein the driving end is provided with grooves, the grooves and bosses formed between the grooves are alternately arranged around the circumference of the driving end, and the bosses have side faces each facing the central hole and located on a plane passing through an edge of a regular polygon and parallel with the longitudinal axis. The adaptor can thus be used to adapt different kinds of working elements to various kinds of driving shafts having different shapes of shaft end.

14 Claims, 5 Drawing Sheets

(56) References Cited

U.S. PATENT DOCUMENTS

| | | | | |
|---|---|---|---|---|
| 7,217,177 | B2 * | 5/2007 | Frech et al. | 451/359 |
| 7,481,608 | B2 * | 1/2009 | Zhou et al. | 408/240 |
| D619,152 | S * | 7/2010 | Evatt et al. | D15/138 |
| 7,833,241 | B2 * | 11/2010 | Gant | 606/176 |
| 8,113,520 | B2 * | 2/2012 | Zaiser et al. | 279/143 |
| 8,151,679 | B2 * | 4/2012 | Bohne | 83/698.11 |
| 8,616,562 | B2 * | 12/2013 | Maras | 279/143 |
| 2005/0153640 | A1 * | 7/2005 | Stein et al. | 451/494 |
| 2008/0210212 | A1 | 9/2008 | Baratta | |
| 2009/0312761 | A1 * | 12/2009 | Boykin et al. | 606/82 |
| 2009/0312762 | A1 * | 12/2009 | Boykin | 606/82 |
| 2009/0312779 | A1 * | 12/2009 | Boykin et al. | 606/171 |
| 2009/0320625 | A1 * | 12/2009 | Kildevaeld | 74/25 |
| 2010/0009613 | A1 * | 1/2010 | Frueh | 451/559 |
| 2010/0056029 | A1 * | 3/2010 | Grunikiewicz | 451/442 |
| 2011/0067894 | A1 * | 3/2011 | Bernardi | 173/1 |
| 2011/0227300 | A1 * | 9/2011 | Zhang et al. | 279/143 |
| 2011/0260414 | A1 * | 10/2011 | Ota et al. | 279/8 |
| 2011/0266758 | A1 * | 11/2011 | Sergyeyenko et al. | 279/106 |
| 2011/0309589 | A1 | 12/2011 | Maras | |
| 2011/0316241 | A1 * | 12/2011 | Zhang et al. | 279/143 |
| 2011/0316242 | A1 * | 12/2011 | Zhang et al. | 279/143 |

* cited by examiner

ADAPTOR FOR ADAPTING A WORKING ELEMENT TO AN END OF A POWER TOOL SHAFT

RELATED APPLICATION

This application claims the benefit of CN 201010192679.0, filed on May 28, 2010, the disclosure of which is incorporated herein by reference in its entirety.

BACKGROUND

The subject disclosure relates to an adaptor for adapting a working element to an end of a power tool shaft.

Tools to which an exchangeable working element may be attached to thereby make a tool multi-functional and suitable for various working situations are known. Such multi-functional tools typically comprise an electric motor and a driving shaft driven by the electric motor for oscillating movement. Working elements, such as cutting or grinding inserts, are mounted to the driving shaft for oscillating therewith so that workpieces are processed by cutting, grinding or the like as desired.

Currently, there are several brands of multi-functional tools in the market, such as a DREMEL brand tool, a FEIN brand tool, and a WORX brand tool. The multi-functional tool of each of these exemplary brands is equipped with a plurality of attachments of its own brand. However, attachments of different brands can not be used interchangeably. In other words, if a user has bought a multi-functional tool of a certain brand and needs to purchase exchangeable attachments, he can only buy the attachments of the same brand while attachments of other brands can not be mounted to the tool he owns already. Accordingly, the poor versatility of such known attachments is troublesome to users.

SUMMARY

To overcome the above described defects in such known multi-function tool systems, the subject disclosure presents an adaptor capable of adapting various kinds of working elements to various kinds of driving shafts having different end shapes. To this end, the subject adaptor includes a central hole, which passes through the adaptor, having a longitudinal axis, a driving end which faces the end of a shaft of a multi-function tool, and a tool end which faces a working element and which has a protruding portion. The driving end is provided with grooves and bosses formed between the grooves which are alternately arranged around a circumference of the driving end. The bosses have side faces each facing the central hole and which are located on a plane passing through an edge of a regular polygon and parallel with the longitudinal axis.

In described embodiments, the grooves may be radial through grooves, two side faces of the through groove may be parallel, the bosses may be in a sectorial shape, the regular polygon may be a regular hexagon, the protruding portion may be a polygonal boss concentric with the central hole, the polygonal boss may be a regular polygonal boss, the protruding portion may be an annular boss concentric with the central hole, the protruding portion may form into protrusions arranged around the circumference of the tool end discontinuously relative to each other. the protrusions may have three apexes, the apexes may be circular arc apexes, the protrusions may be four protrusions evenly arranged around circumference within a scope of 360°, each of the protrusions may be in a T-shape, each of the protrusions may be a columnar protrusion, and/or the driving end may be provided with a recess which takes the edges of the regular polygon as a boundary and which bottom surface is lower than that of the grooves.

The aforementioned defect may also be overcome by an adaptor including a central hole, which passes through the adaptor, having a longitudinal axis, a driving end which faces the end of a shaft of a multi-function tool, and a tool end which faces a working element and having a protruding portion, wherein the driving end is provided with grooves and bosses formed between the grooves are alternately arranged around the circumference of the driving end, wherein the bosses have side faces each facing the central hole, and wherein at least one point of each of at least three side faces of the bosses falls onto an edge of a regular polygon having a central line coincident with the longitudinal axis.

In further described embodiments of such an adaptor, each of the side faces may be a V-shaped surface consisting of a first adapting face and a second adapting face, a projecting line of the first adapting face on a plane perpendicular to the longitudinal axis may fall onto an edge of the regular polygon, and/or a projecting line of the second adapting face on a plane perpendicular to the longitudinal axis may fall onto an edge of the regular polygon after rotating an angle relative to the longitudinal axis.

As will become more apparent, with the above technical solutions, the following beneficial advantages can be obtained:

(1) The driving end is provided with grooves, and the grooves and bosses formed between the grooves are alternately and circumferentially arranged on the driving end, thereby rendering the adaptor capable of adapting a driving shaft whose shaft end having a circle of protrusions and capable of selectively adapting at different positions in the grooves from the center of the shaft based on a radial distance of a shaft-end protrusion to the center of the shaft;

(2) Each of the bosses has a side face facing the central hole and located on a plane passing through an edge of a regular polygon and parallel with the longitudinal axis whereby, with such a structure, a driving shaft whose end is in a polygonal boss shape can be adapted;

(3) Each of the grooves is a radial through groove capable of adapting to a driving shaft whose shaft end is shaped as a boss or protrusion having a plurality of arc apexes with the arc apexes being specifically adapted to the respective openings of the grooves and positioned circumferentially;

(4) The protruding portion of the tool end is a regular hexagonal boss, an annular boss or protrusions arranged circumferentially and discontinuously with each other for adapting to various kinds of working elements; and (5) The adaptor can be completely used as an adaptor which can adapt different kinds of working elements to various kinds of driving shafts having different shapes of shaft end.

DETAILED DESCRIPTION

Exemplary embodiments of the present invention will now be described with reference to the accompanying drawings.

Figure 1:
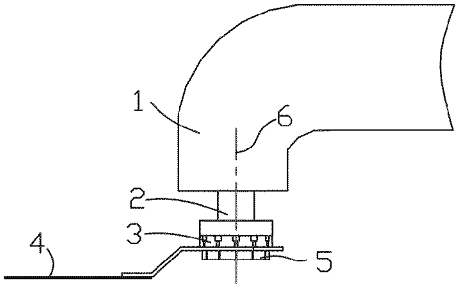
FIG. 1 is a schematic view showing an exemplary working element mounted on an end of a multi-functional tool shaft by an exemplary adaptor.

FIG. 1 is a schematic view showing a working element mounted on an end of a multi-functional tool shaft by an adaptor. The working element 4 is mounted to an end of the driving shaft 2 of the power tool 1 by the adaptor 3 and is fixed and locked by fasteners 5. The driving shaft 2 and the adaptor 3 have a coincident longitudinal axis 6.

Figure 2:
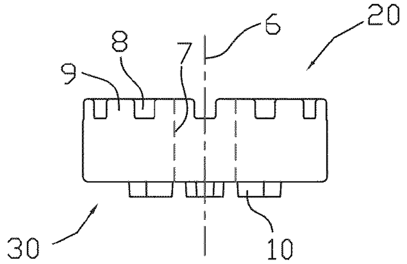
FIG. 2 is a schematic view showing an exemplary adaptor for adapting the working element to the end of the power tool shaft according to the description that follows.
Figure 3:
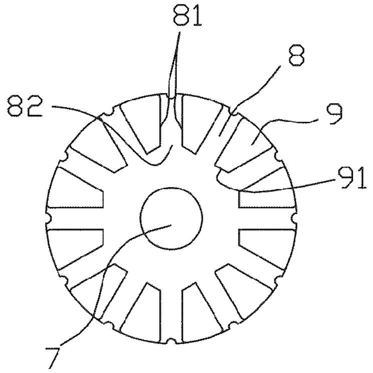
FIG. 3 is a plan view showing a driving end of the adaptor of FIG. 2 facing the end of the shaft.
Figure 4:
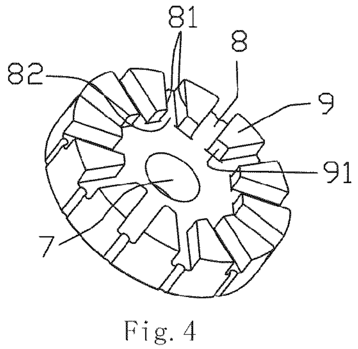
FIG. 4 is a perspective view showing the driving end of the adaptor of FIG. 2 facing the end of the shaft.
Figure 5:
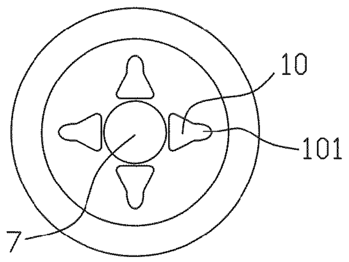
FIG. 5 is a plan view showing a tool end of the adaptor of FIG. 2 facing the working element.
Figure 6:
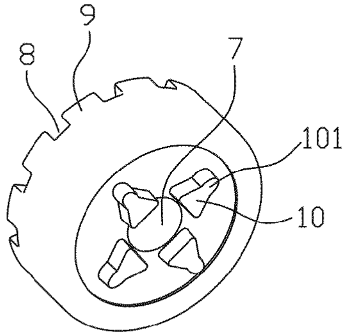
FIG. 6 is a perspective view showing the tool end of the adaptor of FIG. 2 facing the working element.

FIG. 2 is a schematic view showing the structure of an adaptor according to the present invention. The adaptor comprises a central hole 7 having a central line coincident with the longitudinal axis 6, a driving end 20 facing the end of the driving shaft 2, and a tool end 30 facing the working element 4 and having protruding portions. In this exemplary embodiment, the protruding portions are protrusions 10 as shown in FIGS. 5 and 6. The driving end 20 is provided with grooves 8. As can be seen from FIGS. 3 and 4, the grooves 8 are formed around the circumference of the driving end 20 where bosses 9 between adjacent grooves are alternatively arranged. Each of the bosses 9 has a side face 91 facing the central hole 7 and located on a plane passing through an edge of a regular polygon and parallel with the longitudinal axis 6. In this embodiment, the regular polygon is preferably a regular hexagon; the grooves 8 are radial through grooves each with two side faces 81 parallel with each other. The bosses 9 are in a sectorial shape.

Figure 12:
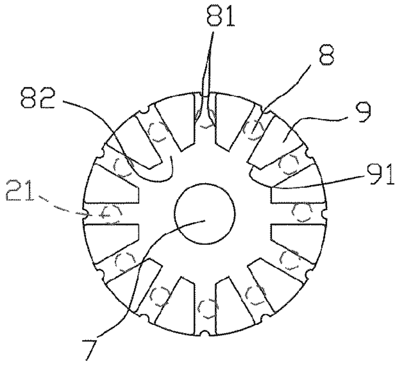
FIG. 12 is a schematic view showing the driving end of the adaptor adapted to an end of a driving shaft having protrusions.
Figure 13:
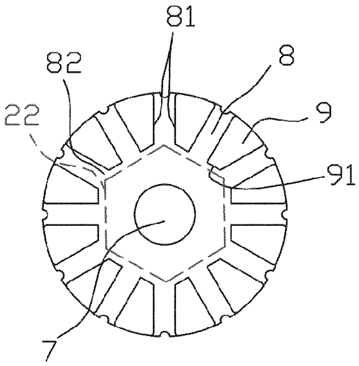
FIG. 13 is a schematic view showing the driving end of the adaptor adapted to an end of a driving shaft having a polygonal boss.
Figure 14:
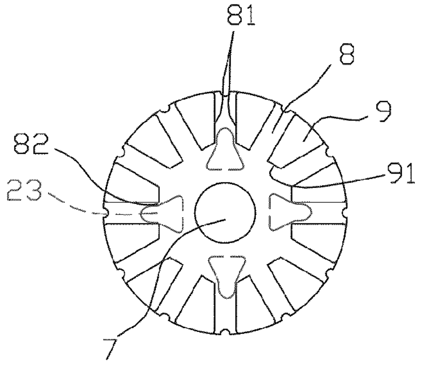
FIG. 14 is a schematic view showing the driving end of the adaptor adapted to an end of a driving shaft having arc apexes.
Figure 15:
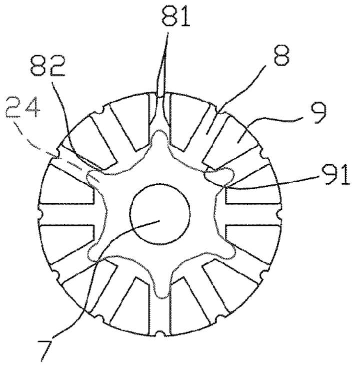
FIG. 15 is a schematic view showing the driving end of the adaptor adapted to an end of a driving shaft having different arc apexes.

The driving end 20 of the adaptor of the present invention has a structure which can adapt to various kinds of end structures of the driving shaft 2. As shown in FIG. 12, since the grooves 8 are formed around the circumference of the driving end 20 where bosses 9 between adjacent grooves are alternatively arranged, the driving end 20 can adapt to a driving shaft 2 whose shaft end has pin-like protrusions 21 in a circle and can selectively adapt at different positions in the grooves 8 from the center of the shaft depending on the radial distances from the pin-like protrusions 21 of the shaft end to the center of the shaft. FIG. 13 shows that since each of the bosses 9 has a side face 91 facing the central hole and located on a plane passing through an edge of the regular polygon and parallel with the longitudinal axis 6, with such a structure, the adaptor can adapt to a driving shaft 2 whose shaft end has a polygonal boss 22. As shown in FIGS. 14 and 15, the grooves 8 are radial through grooves and can adapt to a driving shaft 2 whose shaft end has a boss or protrusion formed with a plurality of arc apexes 23 or 24. Specifically, the arc apexes 23 or 24 are adapted to openings 82 of the through grooves and located circumferentially.

The grooves 8 arranged on the driving end according to the present embodiment are not limited to the radial through grooves. In other embodiments, in order to improve the strength of the adaptor, an end of each of the grooves 8 away from the longitudinal axis 6 is a closed portion which is connected with the adjacent bosses 9, and the other end of each of the grooves 8 near the longitudinal axis 6 is an opening 82. With such a structure, the adaptor can also adapt to a driving shaft 2 whose shaft end has a boss or protrusion with a plurality of arc apexes 23 or 24, thereby achieving the aim of the subject disclosure. In addition, the two side faces 81 of each of the grooves 8 are not necessarily parallel so that they can adapt to pin-like protrusions 21 having different sizes of shaft ends.

Figure 7:
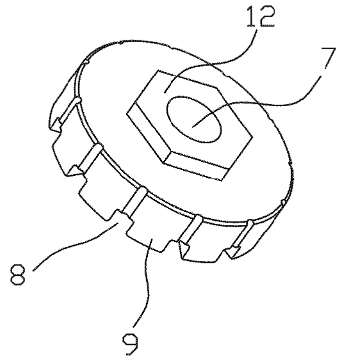
FIG. 7 is a schematic view showing another exemplary structure of the tool end of the adaptor for adapting to the working element.
Figure 8:
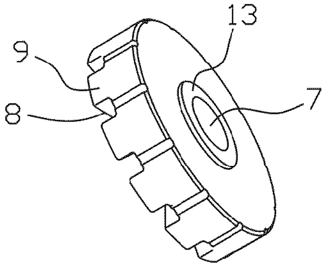
FIG. 8 is a schematic view showing yet another exemplary structure of the tool end of the adaptor for adapting to the working element.
Figure 9:
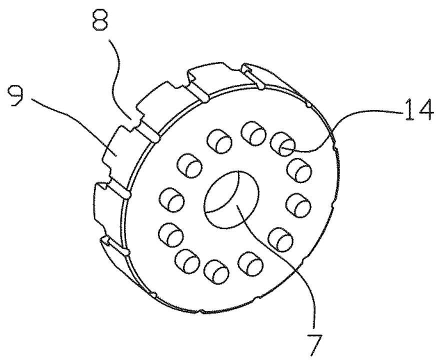
FIG. 9 is a schematic view showing still another exemplary structure of the tool end of the adaptor for adapting to the working element.

FIGS. 5-9 are configuration views of the tool end 30 of the adaptor. Protruding portions are provided on the tool end 30 for adapting to the working element 4. In FIGS. 5 and 6, the protruding portions are protrusions 10 arranged circumferentially and discontinuously with each other along the tool end 30. Each of the protrusions 10 has three apexes 101 which are circular arc apexes. There are four protrusions 10 evenly arranged within a scope of 360° circumference and each protrusion 10 is in a T-like shape. Such a protrusion 10 has high strength and thereby can reliably position different working elements 4 which are available in the current market. In FIG. 9, the protruding portions are columnar protrusions 14 arranged circumferentially and discontinuously with each other along the tool end 30. Such columnar protrusions 14 have good manufacturability and are easy to form. FIG. 7 shows a regular hexagon boss 12 concentric with the central hole 7. The boss 12 employs the surface of the central hole 7 as its internal surface and the hexagonal columnar surface as its external surface. FIG. 8 shows an annular boss 13 concentric with the central hole 7 and having the surface of the central hole 7 as its internal surface and cylindrical surface as its external surface.

Figure 10:
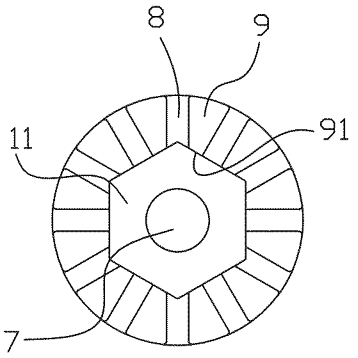
FIG. 10 is a plan view showing the driving end of the adaptor of FIG. 3 provided with a polygonal recess.
Figure 11:
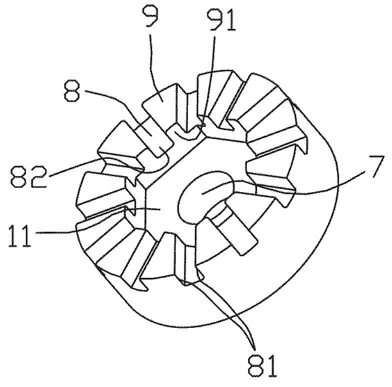
FIG. 11 is a perspective view showing the adaptor of FIG. 10.

As shown in FIGS. 10 and 11, in order to having a certain adapting depth upon the adaption of the driving shaft 2 to the adaptor 3, thereby improving the adapting strength, the driving end 20 is also provided with a recess 11 which is a regular polygonal recess enclosed by the plane where the side faces 91 of the bosses 9 is located. The side faces of the recess 11 are the side faces 91 of the boss 9, and the bottom surface of the recess 11 is lower than those of the grooves 8.

Figure 16:
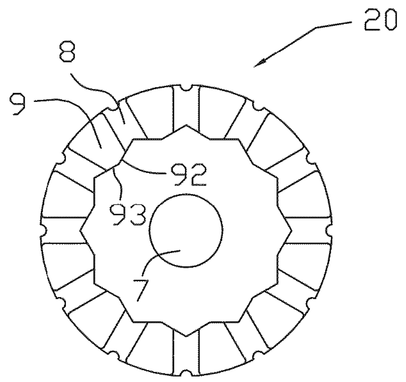
FIG. 16 is a plan view showing another exemplary structure of the driving end of the adaptor facing the end of the shaft.
Figure 17:
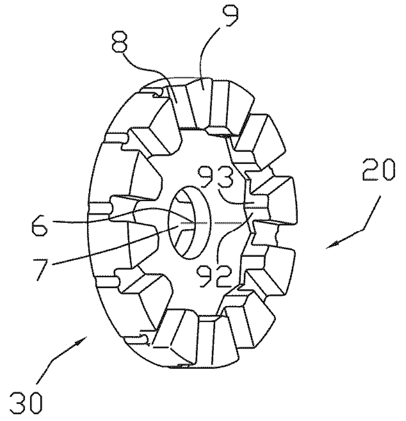
FIG. 17 is a perspective view showing the adaptor of FIG. 16.
Figure 18:
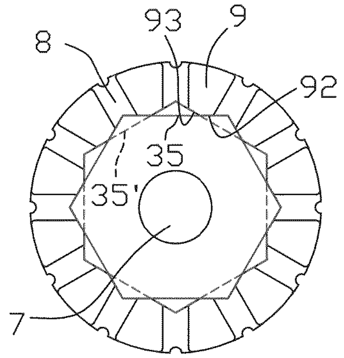
FIG. 18 is a schematic view showing projection of an adapting face of a boss formed on the driving end of the adaptor of FIG. 16 onto an edge of a polygon.

FIGS. 16-18 show another embodiment of the driving end of the adaptor. The adaptor comprises a central hole 7 passing there through and having a longitudinal axis 6, a driving end 20 facing the end of the shaft, and a tool end 30 facing the working element and having a structure different from that of the above embodiment. The driving end 20 is provided with grooves 8 which are arranged separately by the bosses 9 formed there between around the circumference of the driving end 20. Each of the bosses 9 has a V-shaped surface facing the central hole and consisting of a first adapting face 92 and a second adapting face 93. The projecting line of the first adapting face 92 on a plane perpendicular to the longitudinal axis 6 falls onto an edge of the regular polygon 35. The projecting line of the second adapting face 93 on the plane perpendicular to the longitudinal axis 6 falls onto an edge of the regular polygon 35' (as shown by the dotted line) after rotating the regular polygon 35 with a certain angle with respect to the longitudinal axis 6. In this embodiment, the regular polygon 35 is a regular hexagon and the regular polygon 35' are obtained from rotating the regular hexagon 30°.

The above are preferred embodiments of the present invention. In other embodiments, in order to adapt to the end of the shaft having a polygonal shape, the skilled in the art can readily conceive that the circumferential positioning and central positioning relative to the longitudinal axis of the driving end of the adaptor on the shaft end can be achieved as long as, among the side faces of the bosses facing the longitudinal axis, at least three side faces of the bosses and at least one point of each of the at least three side faces fall onto the edge of the polygon, preferably onto the different edges of a polygon having a central line coincident with the longitudinal axis.

It can be seen from the above two preferred embodiments that the driving end of the present invention has a plurality of adapting portions, including two side faces of each of the grooves, opening of each of the grooves, side faces of each of the bosses facing the longitudinal axis, so that the adaptor can adapt to a plurality of shaft end structures.

What is claimed is:

1. An adaptor for adapting a working element to an end of a power tool shaft, comprising:

- a central hole passing through the adaptor and having a longitudinal axis;
- a driving end facing the end of the shaft, the driving end comprising a planar driving surface having a perimeter; and
- a tool end facing the working element and having a protruding portion;
- wherein the driving surface of the driving end is provided with grooves and bosses alternately arranged around a circumference of the driving end,
- wherein each of the bosses has a first side face extending perpendicular from the driving surface facing the central hole and located on a plane passing through an edge of a regular polygon positioning hole defined by the first side faces of each of the bosses, a second side face extending perpendicular from the driving surface and extending radially along the entire length from the positioning hole to the perimeter of the driving surface, and a third side face extending perpendicular from the driving surface and extending radially along the entire length from the positioning hole to the perimeter of the driving surface,
- wherein the grooves are defined by the second and third side faces of adjacent bosses and a lower surface, and the lower surface of the grooves are coplanar with the driving surface such that the grooves extend radially the entire length from the positioning hole to the perimeter of the driving surface.

2. The adaptor for adapting a working element to an end of a power tool shaft as claimed in claim 1, wherein the second and third side faces of adjacent bosses are parallel.

3. The adaptor for adapting a working element to an end of a power tool shaft as claimed in claim 1, wherein the bosses are in a sectorial shape.

4. The adaptor for adapting a working element to an end of a power tool shaft as claimed in claim 1, wherein the regular polygon is a regular hexagon.

5. The adaptor for adapting a working element to an end of a power tool shaft as claimed in claim 1, wherein the protruding portion is a polygonal boss concentric with the central hole.

6. The adaptor for adapting a working element to an end of a power tool shaft as claimed in claim 5, wherein the polygonal boss is a regular polygonal boss.

7. The adaptor for adapting a working element to an end of a power tool shaft as claimed in claim 1, wherein the protruding portion is an annular boss concentric with the central hole.

8. The adaptor for adapting a working element to an end of a power tool shaft as claimed in claim 1, wherein the protruding portion forms into protrusions arranged around the circumference of the tool end discontinuously relative to each other.

9. The adaptor for adapting a working element to an end of a power tool shaft as claimed in claim 8, wherein the protrusions have three apexes.

10. The adaptor for adapting a working element to an end of a power tool shaft as claimed in claim 9, wherein the apexes are circular arc apexes.

11. The adaptor for adapting a working element to an end of a power tool shaft as claimed in claim 9, wherein the protrusions are four protrusions evenly arranged around the circumference within a scope of 360 degrees.

12. The adaptor for adapting a working element to an end of a power tool shaft as claimed in claim 9, wherein each of the protrusions is in a T-like shape.

13. The adaptor for adapting a working element to an end of a power tool shaft as claimed in claim 8, wherein each of the protrusions is a columnar protrusion.

14. The adaptor for adapting a working element to an end of a power tool shaft as claimed in claim 1, wherein the driving end is further provided with a recess having a perimeter defined by the edges of the regular polygon positioning hole and which has a bottom surface that is non-coplanar with the driving surface and lower surface of the grooves.

* * * * *